| Light Bulb | Boolean Function | Binary Number |
| --- | --- | --- |
| 0 | $\bar{A}\bar{B}\bar{C}$ | 0 0 0 |
| 1 | $\bar{A}\bar{B}C$ | 0 0 1 |
| 2 | $\bar{A}B\bar{C}$ | 0 1 0 |
| 3 | $\bar{A}BC$ | 0 1 1 |
| 4 | $A\bar{B}\bar{C}$ | 1 0 0 |
| 5 | $A\bar{B}C$ | 1 0 1 |
| 6 | $AB\bar{C}$ | 1 1 0 |
| 7 | $ABC$ | 1 1 1 |

Inventor:
Midhat Joseph Gazalé
BY Baldwin Wight Diller & Brown
Attorneys

Dec. 9, 1969 M. J. GAZALE 3,482,331

EDUCATIONAL APPARATUS

Filed Nov. 13, 1967 9 Sheets-Sheet 2

Inventor:
Midhat Joseph Gazalé
By Baldwin Wight Diller & Brown
Attorneys

Fig. 7

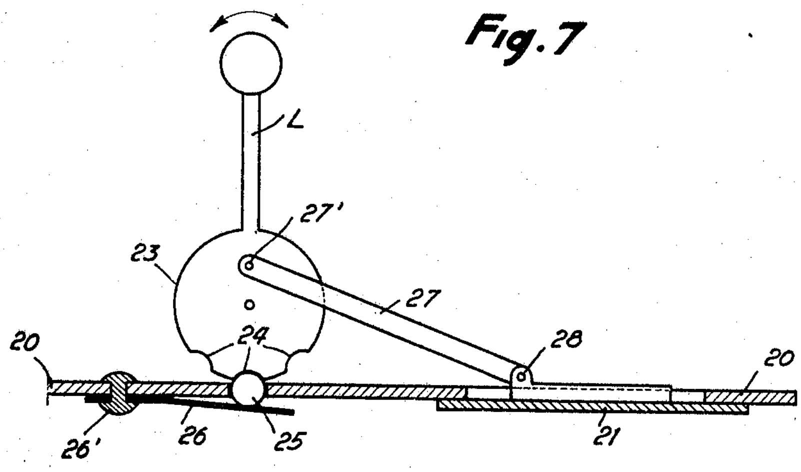

Fig. 9

| Light Bulb | Boolean Function | Switch Position | Number |
|---|---|---|---|
| 0 | $\bar{A}\bar{B}\bar{C}$ | 0 0 0 | 0 |
| 1 | $\bar{A}\bar{B}C$ | 0 0 1 | 1 |
| 0,1 | $\bar{A}\bar{B}$ | 0 0 X | 2 |
| 2 | $\bar{A}B\bar{C}$ | 0 1 0 | 3 |
| 3 | $\bar{A}BC$ | 0 1 1 | 4 |
| 2,3 | $\bar{A}B$ | 0 1 X | 5 |
| 0,2 | $\bar{A}\bar{C}$ | 0 X 0 | 6 |
| 1,3 | $\bar{A}C$ | 0 X 1 | 7 |
| 0,1,2,3 | $\bar{A}$ | 0 X X | 8 |
| 4 | $A\bar{B}\bar{C}$ | 1 0 0 | 9 |
| 5 | $A\bar{B}C$ | 1 0 1 | 10 |
| 4,5 | $A\bar{B}$ | 1 0 X | 11 |
| 6 | $AB\bar{C}$ | 1 1 0 | 12 |
| 7 | $ABC$ | 1 1 1 | 13 |
| 6,7 | $AB$ | 1 1 X | 14 |
| 4,6 | $A\bar{C}$ | 1 X 0 | 15 |
| 5,7 | $AC$ | 1 X 1 | 16 |
| 4,5,6,7 | $A$ | 1 X X | 17 |
| 0,4 | $\bar{B}\bar{C}$ | X 0 0 | 18 |
| 1,5 | $\bar{B}C$ | X 0 1 | 19 |
| 0,1,4,5 | $\bar{B}$ | X 0 X | 20 |
| 2,6 | $B\bar{C}$ | X 1 0 | 21 |
| 3,7 | $BC$ | X 1 1 | 22 |
| 2,3,6,7 | $B$ | X 1 X | 23 |
| 0,2,4,6 | $\bar{C}$ | X X 0 | 24 |
| 1,3,5,7 | $C$ | X X 1 | 25 |
| 0,1,2,3,4,5,6,7 | $T$ | X X X | 26 |

Inventor:
Midhat Joseph Gazalé
BY Baldwin Wight Diller & Brown
Attorneys

Inventor:
Midhat Joseph Gazalé
BY Baldwin Wight Diller & Brown
Attorneys

Dec. 9, 1969 M. J. GAZALE 3,482,331

EDUCATIONAL APPARATUS

Filed Nov. 13, 1967 9 Sheets-Sheet 5

Inventor:
Midhat Joseph Gazalé
BY Baldwin Wight Diller & Brown
Attorneys

Inventor:
Midhat Joseph Gazalé
BY Baldwin Wight Diller & Brown
Attorneys

Inventor:
Midhat Joseph Gazalé
By Baldwin Wight Diller & Brown
Attorneys

Inventor:
Midhat Joseph Gazalé
BY Baldwin Wight Diller & Brown
Attorneys

Inventor:
Midhat Joseph Gazalé
BY Baldwin Wight Diller & Brown
Attorneys

United States Patent Office 3,482,331
Patented Dec. 9, 1969

3,482,331
EDUCATIONAL APPARATUS

Midhat Joseph Gazale, 35 Boulevard du President Roosevelt, Le Vesinet, France

Filed Nov. 13, 1967, Ser. No. 682,053
Claims priority, application France, Nov. 18, 1966, 84,255
Int. Cl. G09b 23/02; G06f 5/02; H04l 3/00
U.S. Cl. 35—30 9 Claims

ABSTRACT OF THE DISCLOSURE

In general terms, the apparatus consists mainly of an assembly of at least two organs, or modules, namely an input module and an output module. The input module is comprised of $n$ manually operated keys or levers, which can each assume three stable positions, independently of the position of the other keys. The keys operate a group of sliding contacts comprising a switching circuit having $2^n$ terminations. The input unit also contains a power supply, which is either a dry cell battery, or a voltage source supplied by the mains. One of the poles of the power supplies feeds the switching circuit, and the voltage corresponding to this pole appears on one or more of the $2^n$ terminations of the switching circuit, depending on the configuration of positions in which the keys are set. Both poles appear as additional terminations of the input unit, which is therefore equipped with $2^n+2$ terminations. If the input and output units are not built into the same physical housing, they may be connected together by means of a plug having $2^n+2$ prongs. The output unit is comprised of a certain number of indicator lights, which are connected, according to different patterns, to the $2^n+2$ prongs of the connecting plug.

The object of the present invention is an apparatus which can be used as an educational tool for the purpose of teaching a number of modern mathematical disciplines such as set theory, symbolic logic, Boolean Algebra, as well as the principles of binary number representation, and arithmetic operations. The apparatus which is the object of the present invention is also an instrument which can serve as an auxiliary for the solution of logical games. In one of its versions, the apparatus can serve as the basis of a game which is played by one or more players, which requires logical inference and memory.

In general terms, the apparatus consists mainly of an assembly of at least two organs, or modules, namely an input module and an output module. The input module is comprised of $n$ manually operated keys or levers, which can each assume three stable positions, independently of the position of the other keys. The keys operate a group of sliding contacts comprising a switching circuit having $2^n$ terminations. The input unit also contains a power supply, which is either a dry cell battery, or a voltage source supplied by the mains. One of the poles of the power supplies feeds the switching circuit, and the voltage corresponding to this pole appears on one or more of the $2^n$ terminations of the switching circuit, depending on the configuration of positions in which the keys are set. Both poles appear as additional terminations of the input unit, which is therefore equipped with $2^n+2$ terminations. If the input and output units are not built into the same physical housing, they may be connected together by means of a plug having $2^n+2$ prongs. The output unit is comprised of a certain number of indicator lights, which are connected, according to different patterns, to the $2^n+2$ prongs of the connecting plug.

In the simplest version of the apparatus, the input module is directly connected to the output module. In other versions, the output module can be connected to at least one intermediary module which will be called program module, the latter being in turn connected to the input module.

In other words, the apparatus consists of an assembly of independent elements, or modules, among which are the input module, the output module, and the program module. The modules may be built within the same physical housing, or in separate housings.

In the latter case, each housing is equipped with one or more multi-prong connector plugs, allowing the connection to other modules. The input unit is equipped with a set of $n$ keys or levers which can each assume 3 stable positions, the high position, the medium or neutral position, and the low position.

According to the concept underlying the apparatus, each key is made to represent a binary or Boolean variable, or a logical proposition, or a set, depending on whether the apparatus is used within the context of binary arithmetic, symbolic logic or set theory, respectively. Within these contexts, the low position of a key corresponds to the value "1" of the associated Boolean variable, or to a situation in which the associated logical proposition is true, or to the formation of a set containing the elements represented by this key.

Conversely, the high position of a key corresponds to the value "0" of the associated boolean variable, or to a situation in which the associated logical proposition is false, or to the formation of a set not containing the elements represented by this key.

The medium, or neutral position of a key corresponds to the independence of a binary function of the value, whether it be zero or one, of the associated variable, or to the independence of a given situation of the associated logical proposition, whether it be false or true, or to the formation of a set whose elements may or may not belong to the set represented by the key.

The keys operate groups of sliding contacts comprising a switching circuit having $2^n$ terminations connected to the following module, whether this be a program or an output module.

Each one of the possible $3^n$ combinations of settings of the input keys or levers, is called an input configuration, and materializes one of the $3^n$ logical functions of the input, which can be generated by the apparatus.

The input module also contains a power supply, whose poles are regarded as two additional terminations of the input unit, which consequently has $2^n+2$ terminations.

Each input key operates a bank of sliding contacts each having a common and two poles. When the key is set on either the high or low position, the common is electrically connected to the high or low pole respectively. When the key is set in the medium, or neutral position, the common is electrically connected to both the high and the low poles simultaneously.

The program module in one of its versions, consists of a housing into which a punched card can be introduced, which is designed to allow $2^n$ punch positions. This module possess $2^n$ input terminations and $2^n$ output terminations. There is a one-to-one correspondence between each input and each output termination, so that a contact is established electrically between the terminations of the same pair only if a hole is found in the punched card in the punch position corresponding to this pair.

In another version, the program module consists of an array of $2^n$ jacks, each of which is connected on one side to an input termination, and on the other side to an output termination.

The apparatus is provided with plugs corresponding to the jacks. The contacts of the plug are short-circuited together, so that whenever a plug is introduced into a jack, an electrical contact is established between the corresponding input and output terminations of the program module.

The output module is comprised of indicator lights connected to $2^n$ terminations, according to different connection patterns.

In one version, the output module is comprised of $2^n$ indicator lights arranged upon the face of a display area according to one of many geometric figures. Examples of such figures are a simple straight line array, in which each indicator is numbered say from 0 to $2^n-1$, or a rectangular array of $2^m$ rows and $2^p$ columns, so that $n=m+p$. Other examples are the figures representing the diagrams universally known as VENN, or EULER diagrams. A still further example is the arrangement of indicator lights so that they each fall upon the vertex of a cube. This yields visual representations of functions of 3 variables with the familiar 6-face cube, but can also be used to represent functions of more variables with geometric figures known as hypercubes.

Another version of the output module contains only two lights, say a green and a red light, the red light representing a binary "zero" or "Falsehood," and the green light representing binary "one" or "Truth."

An output module can be equipped with an inverter switch, the function of which is to instantly turn off all the lights which were previously on, and vice-versa, turn on all the lights which were previously off. The present invention describes an economical solution to the inversion function of the aforementioned switch, which requires neither relays nor active electronic components, and which does not burden the input module with any additional sliding contacts. The solution described in this patent takes advantage of certain non-linear characteristics of incandescent light indicators, and associates to each output indicator, an auxiliary incandescent light bulb, concealed within housing, yielding a circuit of remarkable simplicity. In the version of the two-indicator module, the red light is none other than the auxiliary light bulb.

Each application of the apparatus requires at least one input and one output module. Certain applications require, in addition, a program module, and in particular those applications using a two indicator output module.

An example illustrating how the apparatus can be used is described, using a 3-key input module, connected to an 8-indicator light output module, the bulbs being arranged so that each one illuminates one of the seven areas circumscribed by the intersecting circles of the well-known Venn diagram, the eighth area being that outside all three circles.

Has the apparatus been conceived with keys having only two stable positions, a high and a low, it would never be possible to turn on more than a single light at any given time. With the apparatus described in this patent, however, if one of the three keys is set in the neutral position, each configuration of high and low of the remaining two keys turns on two lights simultaneously. Similarly when two keys are set in the neutral position, the remaining key turns on four lights for each of the high and low settings, thus illuminating an entire circle, or the entire complement of that circle. Finally, if all three keys are set in the neutral position, all eight lights are turned on simultaneously, thus representing the "universe of discourse."

An example ilustrating the use of an apparatus comprised of an input module, a program module, and a two-light output module is given, which is based on the famous logical puzzle of the fox, hen, corn and farmer. The apparatus has four keys, each representing one of the aforementioned protagonists. The low setting of key places that protagonists on one bank of a river, and the high setting places him on the other bank. The intermediate setting is not allowed.

To play the game, a pre-punched card is introduced into the program module, with holes punched in those positions among the possible sixteen, corresponding to an allowable combination of the protagonists at any given time. When the player manipulates the keys, the green light is turned on whenever a safe situation exists, and the red light is turned on when an unsafe combination is fallen upon.

The invention is illustrated by, but limited to, certain construction examples described hereafter, with the aid of the attached figures and diagrams.

Figures 1, 2:
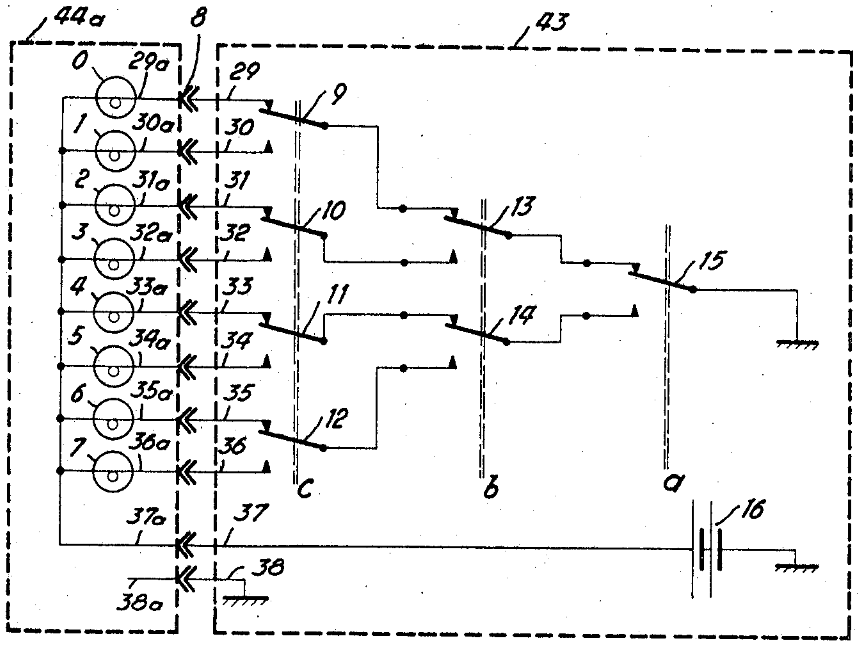
FIG. 1 is a diagram showing the wiring of the apparatus illustrating the invention.
FIG. 2 is a corresponding table showing an application of the invention to boolean algebra, based on the apparatus of FIGURE 1.
Figure 4A:
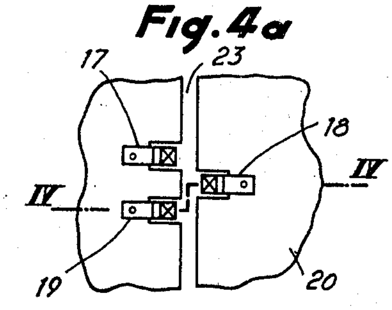
FIGS. 4, 5 and 6 show the assembly of a switch, and more particularly.
Figure 4B:
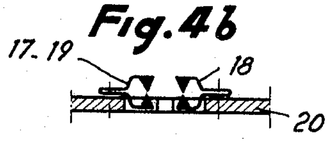
Figure 5A:
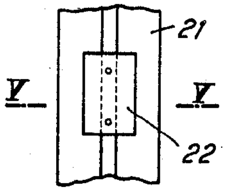
Figure 5B:
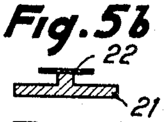
Figure 6A:
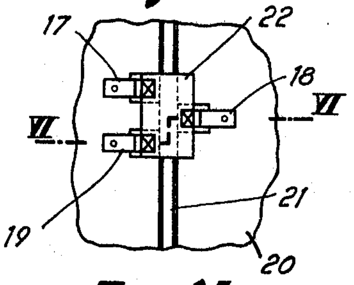
Figure 6B:
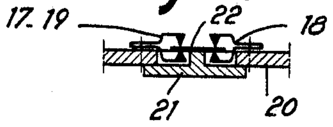
Figure 8:
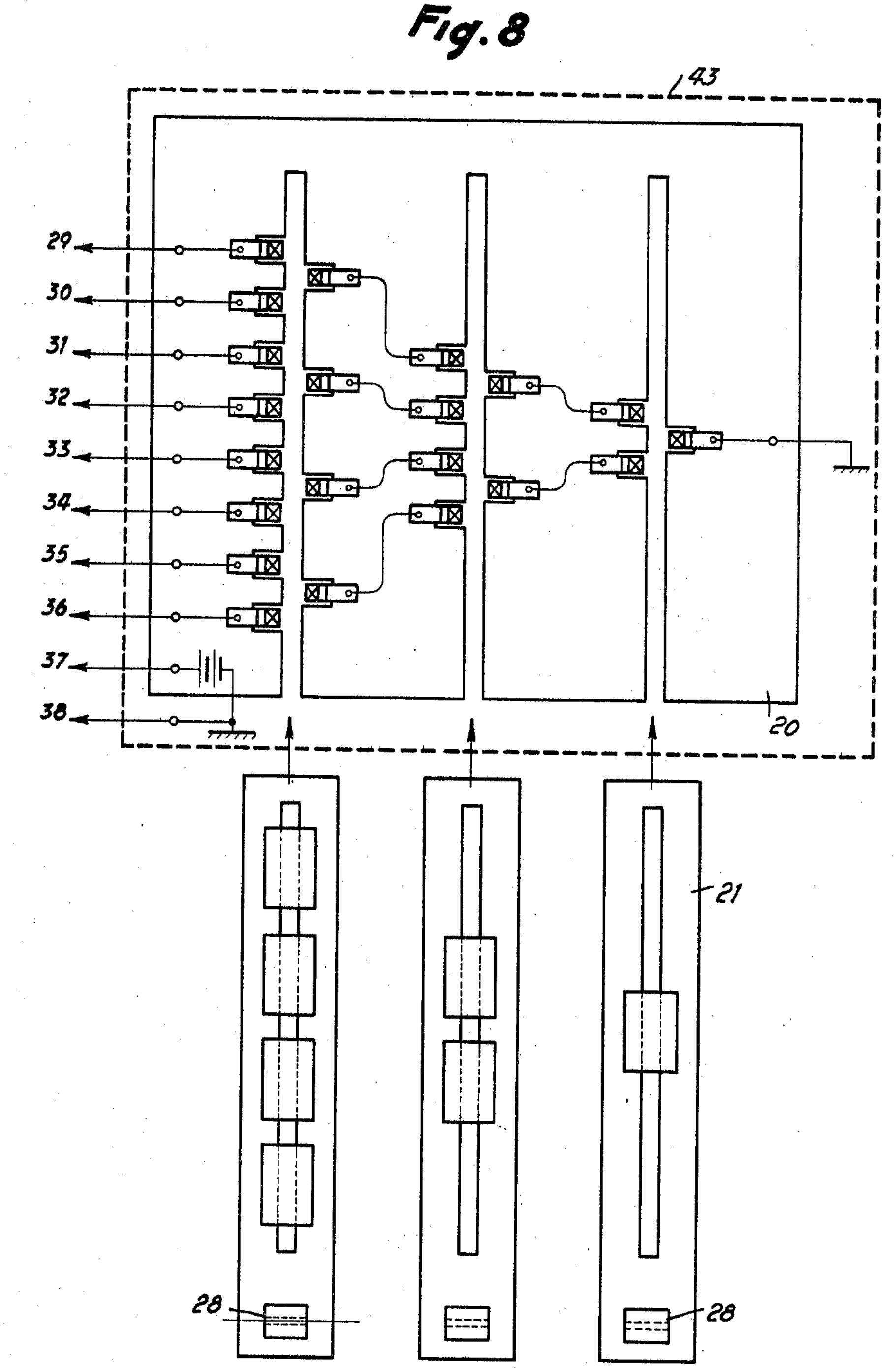
Figure 10A:
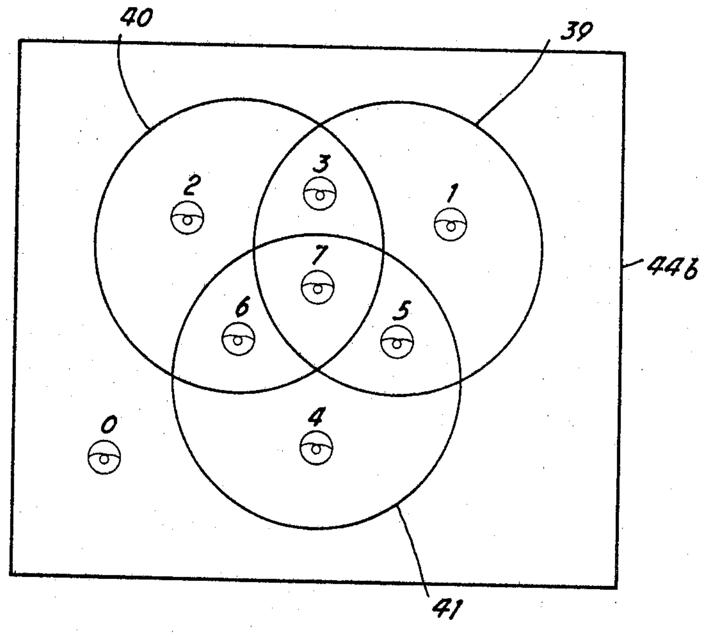
Figure 10B:
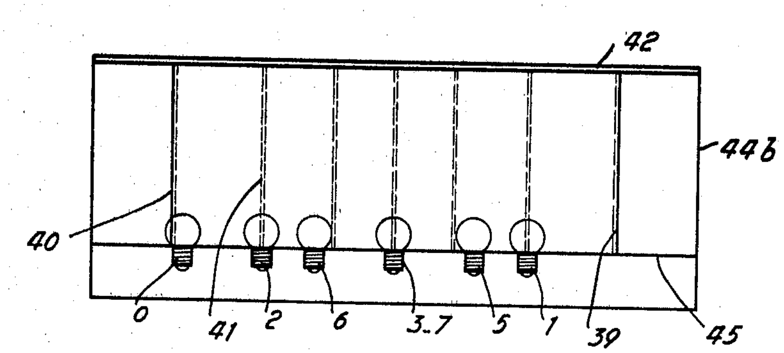
Figure 11:
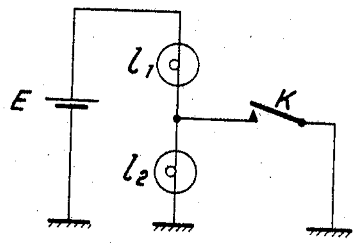
Figure 12:
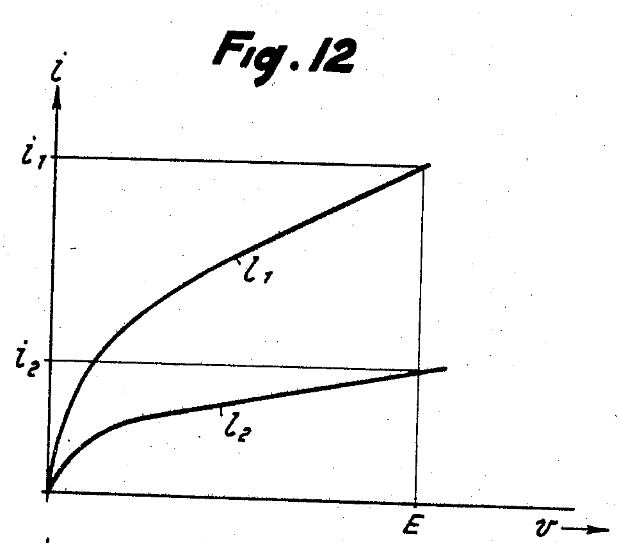
Figure 13:
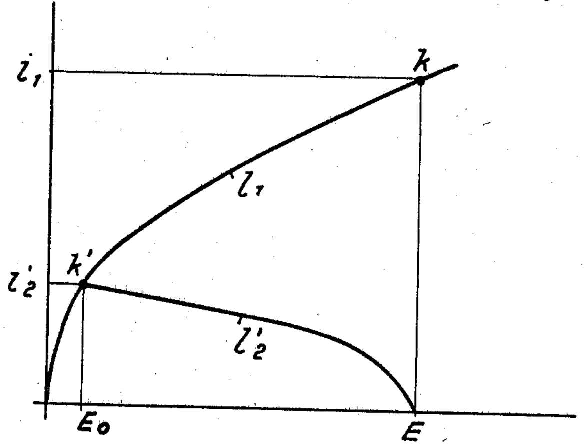
Figure 14:
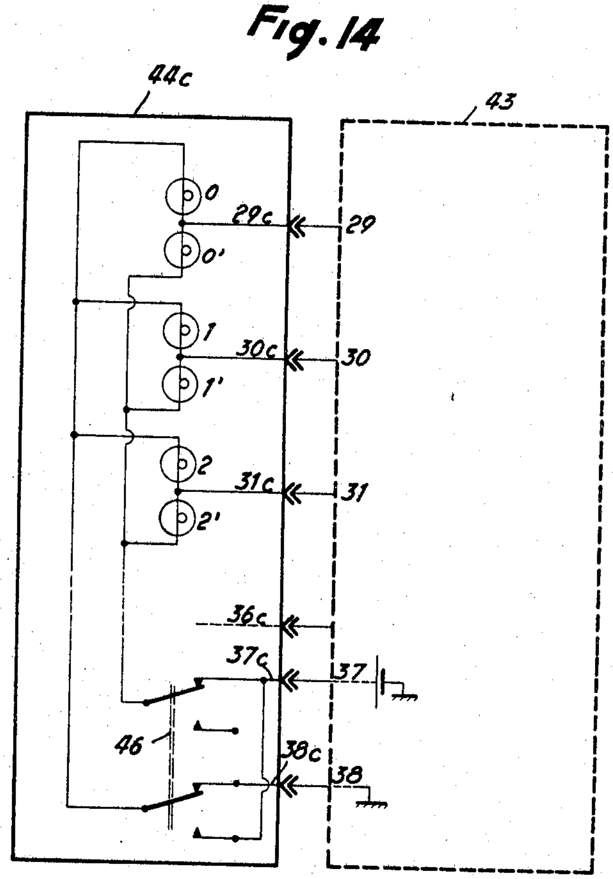
Figure 15:
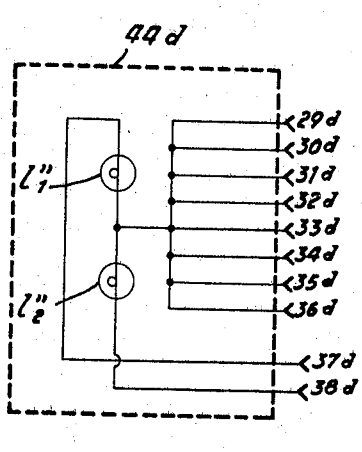
Figure 16A:
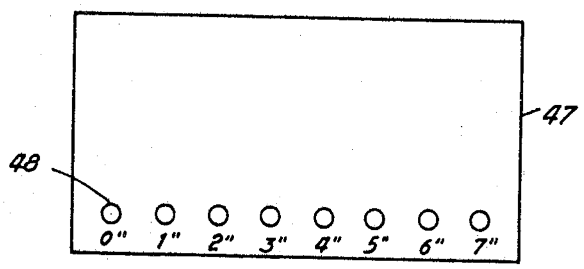
Figure 16B:
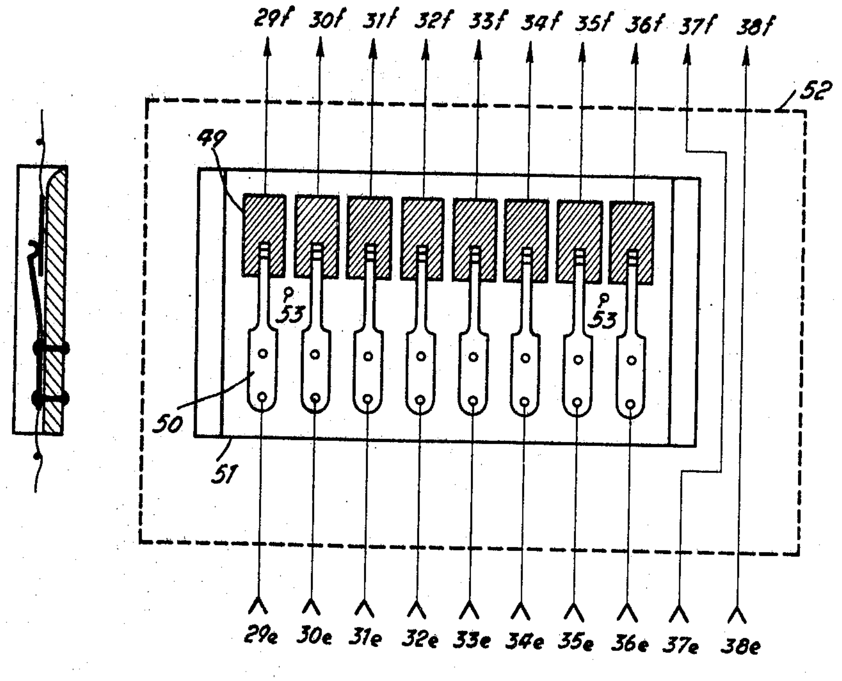
Figure 17:
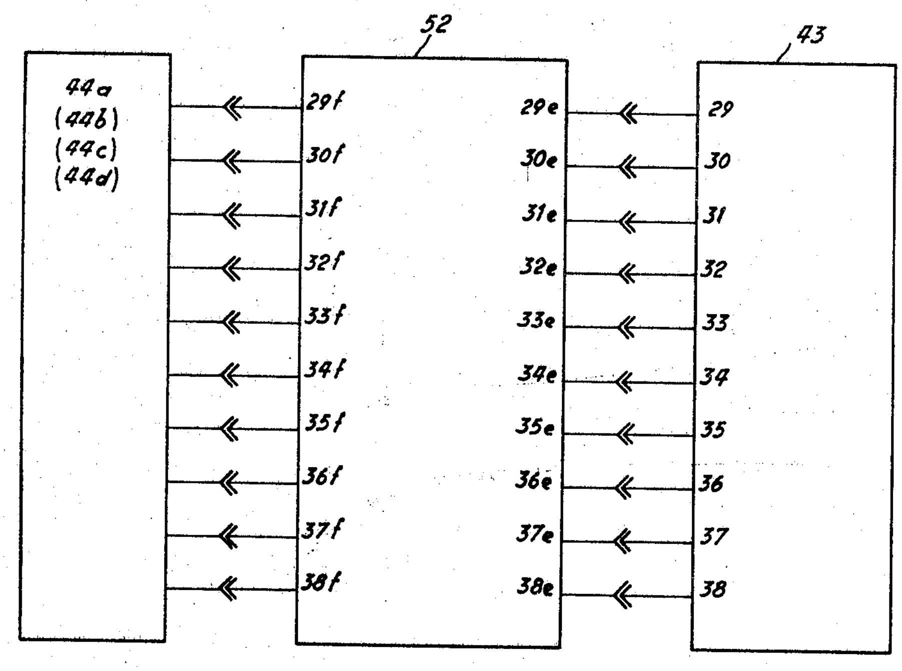

FIG. 4*a* is a partial plan view of the fixed part of the switch;

FIGURE 4*b* is a sectional elevation, according to IV—IV of FIGURE 4*a*;

FIG. 5*a* is a partial plan view of the moving part of the switch;

FIG. 5*b* is a sectional elevation, according to V—V of FIGURE 5*a*;

FIG. 6*a* is a partial plan of the assembly of the fixed and moving parts of the switch;

FIG. 6*b* is a sectional elevation, according to VI—VI of FIGURE 6*a*;

FIG. 7 is an elevation, partly sectional, of a lever which can assume three stable positions, and which can be used to activate the switch;

FIG. 8 is a schematic plan of a 3-variable input module;

FIG. 9 is a correspondence table showing certain applications of the apparatus, boolean algebra for example;

FIG. 10 is an assembly mode for light bulbs visualizing Venn diagrams, where FIGURE 10*a* is a plan of the assembly, and FIGURE 10*b* is a cross-sectional elevation of that assembly;

FIG. 11 is a diagram showing how two light bulbs can be associated with a key and a power supply;

FIG. 12 is a diagram showing the current-voltage characteristics of the light bulbs of FIGURE 11;

FIG. 13 is another diagram of the same kind as that of FIGURE 12, which outlines the operating point of the arrangement;

FIG. 14 is a simplified schematic representation of the application of the principle of FIGURE 11 to an assembly such as that illustrated by FIGURES 1 and 8;

FIG. 15 is the wiring diagram of a variation of the invention output module;

FIG. 16*a* shows a plan view of a punched card used in a program module;

FIG. 16*b* shows a schematic construction of a card reader which can be used in conjunction with the punched card of FIGURE 16*a*;

FIG. 17 shows the assembly of an input module, a program module, and an output module, according to the invention.

FIGURE 1 represents a circuit which illustrates the operation of the apparatus. On this figure the circuit uses only three keys as an illustration. The same underlying idea may be applied to a lesser or greater number of keys without difficulty. FIGURE 1 shows three groups of switches: the group of switches numbered 9 through 12, the group of switches numbered 13 and 14, and the switch 15 which alone comprises the third group.

All the switches belonging to the same group are ganged into one bank, so that the operation of a single key transfers all the switches of the same group simultaneously and in the same direction. Using elementary notions of boolean algebra, formal description of the apparatus can be made easier, by associating to each key and its group of switches binary variables *a*, *b* and *c*, according to the order shown in FIGURE 1. The "high" position of switch 15 corresponds to value $\overline{A}$ or (Not A) of variable *a* while the "low" position of this switch corresponds to value A. Similarly for *b* and *c*, the high positions correspond to $\overline{B}$ and $\overline{C}$, and the low positions to B and C respectively.

In one modular version of the apparatus, where separate housings are used for the different modules, the keys and their corresponding switches are mounted in a housing 43, also containing a power supply, illustrated by dry battery 16, which can also be a voltage source derived from the mains, via a transformer for example.

The contacts of group *c* switches are connected to the prongs or lugs of a ten-prong connector. These contacts are numbered 29 through 36. The last two prongs, namely 37 and 38 are connected respectively to the "hot" point of the power supply, and to the "ground," the latter being also connected, if necessary, to the chassis, or common, or housing.

Eight light bulgs, which are selected so that they give adequate light output when connected to power supply 16, are numbered 0 through 7, and mounted on the apparent side of housing **44*a***. One electrode from each bulb is connected to one point of a ten contact connector.

The other electrodes are all connected to point **37*a* of the same connector. In this particular example, point 38*a*** is not connected.

Housings 43 and **44*a* are interconnected as shown by 8** of FIGURE 1.

Operation of the apparatus is described for simplicity in two steps, the first assuming that switches 9 through 15 of FIGURE 1 are ordinary switches with one high position and one low position, and the second step, which corresponds to the principle of this patent, where switches 9 through 15 can each assume, in addition to the high and low position, an intermediate or neutral position, where the common is electrically connected to both the high and low contacts of the switch.

Beginning with the first of the two aforementioned steps, examination of FIGURE 1 reveals that light bulb 0 is on, only if keys *a*, *b* and *c* are all on "high." In boolean notation, bulb 0 represents function $\overline{ABC}$. Similarly, bulb 1 represents function $\overline{AB}C$, and so on.

Figure 3A:
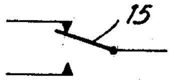
FIG. 3 is a schematic representation of a switch utilized in the apparatus, shown in high position on FIGURE 3*a*, in middle position on FIGURE 3*b*, and in low position on FIGURE 3c.
Figure 3B:
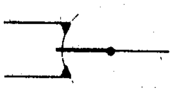
Figure 3C:
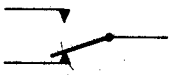

The table shown in FIGURE 2 indicates the correspondence between the eight light bulbs, and the eight Boolean functions generated by the eight possible configurations of the three variables *a*, *b* and *c*. If it is agreed that variables *a*, *b* and *c* now represent the binary digits of a number, so that the "high" position represents value "0" and the "low" position value "1," then the right hand side column of this table shows the correspondence between the eight natural numbers 0 through 7, and their binary representation. In this arrangement *c* corresponds to the units, *b* to the two's and *a* to the fours which are the powers of two corresponding to the weights of the respective columns. Proceeding now with the second step of the description, the switches used in the apparatus are of a type as illustrated in FIGURES 3*a*, 3*b* and 3*c*. Each switch, in addition to the two traditional positions, namely the high position (FIGURE 3*a*) and the low position (FIGURE 3*c*) can assume a third stable position, as shown in FIGURE 3*b*, which is intermediate to the high and low position and which is referred to as the medium or neutral position. In this position, the common of the switch makes electrical contact with both the high and low contacts simultaneously.

A construction example is given for such a switch on FIGURES 4, 5 and 6. Contacts 17, 18 and 19, mounted on a board 20 of insulating material, correspond to the common, the high and the low contacts respectively. FIGURE 4*b* is a cross section of the board showing a side view of the contacts. A strip 21 which can slide freely in slot 23 of the board carries a thin plate 22 made of metal sheet which slides between the points of contacts 17, 18 and 19. FIGURE 5*b* is a cross section of the strip. FIGURES 6*a* and 6*b* show the assembly of the elements of FIGURES 4 and 5.

Plate 22 is of sufficient length and breadth so that, when the switch is set in neutral, this plate makes good contact with all of contacts 17, 18 and 19 simultaneously. A mechanical arrangement such as that shown in FIGURE 7 allows the sliding switch to assume three stable positions the first where an electrical connection is established between 17 and 18, the second where the connection is established between 17, 18 and 19, and the third where the connection is established between 18 and 19.

Lever L which operates the sliding switch rotates a wheel 23 which has three notches 24 in one of which spherical ball 25 is locked under the action of spring 26. The axis of the wheel is solid with board 20. A connecting rod 27 transforms the rotation of wheel 23 into a translation of strip 21 upon which rod 27 rotates in articulation 28.

FIGURE 8 shows a construction example for a three variable apparatus using exactly the same wiring as that of FIGURE 1, and which is assembled with switches such as that described in FIGURES 3 through 6. Points 29 through 38 are connected as on FIGURE 1 to a connector plug which matches that of housing **44*a***.

Each of the three levers *a*, *b* and *c* are of the same type as lever L of FIGURE 7, and can each assume 3 stable positions. The three levers together can therefore assume 27 differnet configurations, corresponding to the eight functions of the table of FIGURE 2 augmented with 19 additional logical functions. Each one of the eight original functions corresponds to the turning on of a single light bulb, while the additional functions correspond to the turning on of groups of 2, 4 or all lights simultaneously.

A construction having electrical properties identical to those of the construction shown on FIGURE 8 can be achieved using rotary switches which are built to assume three stable positions, where the middle position establishes a connection between the common and both the "normally closed' and "normally open" contacts.

In Boolean notation, the neutral position of lever *a* corresponds to the generation of a function which is independent of a variable *a*, such as $\overline{B}$C for example. Indeed, if *a* is set in neutral, *b* in high, and *c* in low, it can be readily observed on the diagram of FIGURE 8, that lights 1 and 5 are turned on. The function thus generated correponds to the logical sum, known as logical "OR" of functions $\overline{A}\overline{B}C$ and $A\overline{B}C$, which yields $\overline{A}\overline{B}C+A\overline{B}C=\overline{B}C$.

The table shown in FIGURE 9 indicates the correspondence between the light bulbs, the boolean functions and the switch positions, where it is agreed that symbol 0, symbol 1 and symbol X respectively represent the high, low and medium positions. Configuration 26 corresponds to logical truth, and in set theory to the universe. An example illustrating the application of the apparatus to binary number representation is given using a particular problem to be solved, namely that of finding the binary digits of a number between 0 and 7, say 5.

Had the apparatus been equipped with keys having only two stable positions, the search would involve any number of steps between 1 and 8. Using 3 position switches, however, reduces the number of trials to strictly 3, as follows: At the outset, switches *a*, *b* and *c* are all in neutral. The switches are then tested one by one, and the correct setting of each, is that corresponding to the turning on of bulb 5 among the group of four bulbs that are turned on at every test.

A paper card 47, shown on FIGURE 16*a*, is divided into 8 equal zones, in each of which a hole 48 can be punched. The card reader may be constructed as shown by 52 of FIGURE 16*b*. On a board of insulating material 51, eight strips 49 are circuit-printed. Eight spring blades 50, of Phosphor bronze for example, are attached at one extremity to plate 51, and their free end makes contact with the corresponding strip 49. Blades 50 are each connected to one of the eight plugs 29*e* through 36*e* of a 10 plug connector. Strips 49 are each connected to the eight plugs 29*f* through 36*f* of a 10 plug connector, with the last two plugs 37*f* and 38*f* being directly connected to 37*e* and 38*e*. In the absence of a punched card, all the input plugs are in electrical contact with the output plugs, on a one-to-one basis. When a card is inserted, all electrical contacts between connectors 29*e* through 36*e* and 29*f* through 36*f* are broken, except for those that encounter a hole on the card. The function of stoppers 53 is to stop the card 47 inside the housing and register it properly. The punch zones are number 0″ through 7″, these coresponding to bulbs 0 through 7 respectively.

Another construction does not require punched cards. Eight jacks are each connected on one side to the connector points leading to the input module, and on the other side to the connector points leading to the output module. Each jack is normally open unless a plug is introduced, the plugs having been short-circuited previously. Thi stype of terminal is therefore an open circuit in normal condition, and establishes a path from one input to the corresponding output only if a short circuit plug is introduced in the jack corresponding to these points.

FIGURE 17 shows how module 52 is connected on one side to an input module 43, and on the other side to one of output modules 44*a*, 44*b*, 44*c* and 44*d*. When, in such an arrangement, output module is of type 44*d*, the green light will be turned on if the configuration "dialed" on the keys corresponds to an existing hole in the punched card, or a short-circuit plug within corresponding jack. In all other cases the red light is turned on.

This apparatus can be used for logical puzzles, such as the famous farmer, fox, corn and hen puzzle. A card is prepunched in all zones corresponding to safe "configuration" of the four protagonists, assuming that each of the 4 keys in a 4-key input module represents one protagonists, and that each of the high and low settings respectively represents the north and south sides of the river to be crossed, the neutral positions being forbidden. The output module in this case is of the red-and-green light type, where green indicates safety, and red danger.

For example, in a four-key input module, with keys A, B, C and D representing the farmer, the fox, and the corn respectively, we may assume that the high and low positions of the keys represent the two banks of a river. The game starts with all protagonists on one bank and the object is to terminate the game with all protagonists on the other bank, with the constraints that no crossing may be done without the farmer, and that the latter can be accompanied by only one animal or object in any one crossing. Furthermore, the hen may not be left either in the presence of the fox or in that of the corn without the farmer being on the same bank.

As mentioned before (column 4, lines 1–8) to play the game, a pre-punched card is introduced into the program module, as previously explained (column —), with holes punched in all positions except the following unsafe positions:

$$\bar{A}\bar{B}CD,\ \bar{A}B\bar{C}\bar{D},\ \bar{A}BCD,\ A\overline{BCD},\ A\overline{BC}D,\ AB\overline{CD}$$

When the player manipulates the keys, the green light is turned on whenever a safe situation exists, and the red light is turned on when an unsafe combination is fallen upon. The apparatus is therefore a material embodiment of the above mentioned rules of the game, and the player can exercise his skill in trying to perform the crossings without allowing the red light to shine.

A three-key input module, a program module and a red-and-green light output module can together comprise an apparatus which is programmed to be a binary adding machine, using two program cards: a sum and a carry card. The first is punched in zones 1″, 2″, 4″ and 7″, and the second in zones 3″, 5″, 6″ and 7″.

In order to add two binary digits, or bits, the first bit is dialed on *a*, the second on *b*, and the carry from the previous addition on *c*.

When the sum card is introduced, the output module will turn the green light on for "one" sum, and the red light on for a zero sum. Similarly for the carry, when the carry card is introduced.

The above described examples were given assuming three or four key input modules, with the corresponding output and program modules. The principles underlying the present invention can however be extended to any number *n* of keys. In those case, modlues 44*a*, 44*b*, and 44*c* will be dimensioned to accommodate $2^n$ light bulbs. Similarly the program module will have to be able to accommodate $2^n$ hole punched cards, or $2^n$ jacks.

Another application example consists in assisting in solving a problem such as simplifying a boolean algebraic expression. For instance the expression $$f(A,B,C)=\bar{A}B+AC+BC$$

One begins by "dialing" the function $\bar{A}B$ (which is function number 5 in table 9) by setting key *a* on high, key *b* on low, and key *c* on neutral. One notes that bulbs 2 and 3 are turned on. One then dials function AC, which turns on bulbs 5 and 7. This indicates that function $\bar{A}B+AC$ corresponds to bulbs 2, 3, 5 and 7. If one now dials function BC, the bulbs that are turned on, namely 3 and 7 are a subset of those bulbs which were previously turned on. BC is then regarded as a superfluous or redundant term.

The output module that is now described has exactly the same electrical construction as module 44*a*, but the bulbs are now arranged in a fashion materializing the well known Venn Diagram, otherwise known as Euler's circles. FIGURES 10*a* and 10*b* show a construction example. Three thin walled opaque, and cylindrical shells 39, 40 and 41 are embedded in each other so that their generators are parallel, and each cylinder intersects the other two. Their bases are sandwiched between two parallel planes 42 and 45. Plane number 42 is made of a translucent material such as ground glass. Plane 45 is an insulating board bearing the light bulb as shown on FIGURE 10*a*.

To illustrate the utilisation of this type of output module, it is assumed that key *a* is set on low, the other two keys being left on neutral. This turns on bulbs 4, 5, 6 and 7, thus illuminating the entire area within the circle of cylinder 41. Similarly, dialing B illuminates the circle of cylinder 40. Dialing AB turns only bulbs 6 and 7 on, thus illuminating the region that is common to A and B.

The possibilities of the apparatus may be greatly increased thanks to the adjunction to the previously described features, of an additional feature which allows, at low cost, the implementation of "Inversion" or "Negation," or "Complementation."

According to this invention, an additional key is provided, which has only two stable states, and whose operation, regardless of the setting of keys *a*. *b* and *c*, turns on all bulbs that were previously off, and vice versa, turns off all the bulbs that were previously on. The construction that is described uses neither relays nor active electronic components. It strictly relies on the use of ordinary light bulbs such as can be readily found at low cost and in great abundance on the market. FIGURES 11 through 13 illustrate this construction. Light bulbs $l_1$ and $l_2$ are chosen so that they operate normally under voltage E, and $i_1$ and $i_2$ are their nominal currents under that voltage.

$i_2$ is chosen to be much lower than $i_1$. An experimentally good ratio of $i_2$ to $i_1$ is 1 to 3.

FIGURE 12 shows the current voltage characteristics of ordinary incandescent light bulbs, which shows strong non-linearity in the neighbourhood of the vertical axis.

The bulbs are mounted together with power supply E as shown on FIGURE 11. Key K can short-circuit to ground potential the middle point, between the two bulbs.

FIGURE 13 shows the mirror image $l'_2$ of the characteristic $l_2$ with respect to the vertical axis, shifted to the right to such an extent that the origin of this curve is at point E on the horizontal axis. This gives operating point $k'$ of the circuit, when key K is open. By conveniently selecting $l_1$ and $l_2$, point $k'$ is very close to the vertical axis, thanks to the strong curvature of characteristic $l_1$ in that region. Light bulb $l_1$ therefore does not dissipate sufficient power to give a visible glow. Light bulb $l_2$, however almost dissipates its nominal power. If key K is closed, bulb $l_2$ is short circuited, and $l_1$ is lit at full power.

The behaviour of the simple arrangement is therefore the following. When K is open, $l_1$ is off and $l_2$ is on. When K is closed, $l_1$ is on and $l_2$ is off. As an illustrative indication, E can be taken equal to 6 volts, with $i_1$ and $i_2$ being respectively 300 and 100 milliamperes.

This construction principle can be applied to an 8-bulb apparatus, as shown in FIGURE 14.

To each bulb 0, 1, 2 . . . is associated a bulb 0′, 1′, 2′ . . . which may be concealed inside the housing. The visible bulbs are the low current ones, and the auxiliary bulbs are the high current ones.

When switch 46 is on low, bulbs 0, 1, 2 . . . correspond to the normal functions of FIGURE 2.

When switch 46 is on high, these bulbs correspond to the inverse, or complement of these functions.

Another type of output module is shown in FIGURE 15 in which the module 44*d* is substituted for modules 44*a*, 44*b* or 44*c*.

Bulbs $l''_1$ and $l''_2$ are comparable in their principle of operation to bulbs $l_1$ and $l_2$ of FIGURES 11 through 13. For instance $l''_1$ may be green and $l''_2$ red. The utilisation of such a two-bulb module is however justified only if a program module is used, between modules 44*d* and 43, such as the punched card reader described below.

What I claim is:

1. An apparatus for teaching set theory, logic and Boolean Algebra as well as the principles of binary number representation, and arithmetic operations, and which can serve as an auxiliary for the solution of problems and playing of logic games, said apparatus comprising an assembly including at least an input module and an output module, said input module comprising *n* keys each adapted to be positioned selectively in three stable positions, a switching circuit including an *n* level binary tree and having $2^n$ terminations each of which corresponds to an extremity of said binary tree, said switching circuit comprising a plurality of switches operable by said keys, each of said switches being adapted to be positioned selectively in three stable positions, the first of said positions establishing contact between the midpoint of the switch and one of its two contact points, the second of said positions establishing contact between said midpoint and the second of said contact points, and the third of said positions establishing contact between said midpoint and both said contact points simultaneously, each key representing a binary variable corresponding to one of the *n* levels of said binary tree, one of said three positions of a key corresponding to value "1," another position of the same key corresponding to value "0" of the associated Boolean variable, and the third position of the same key corresponding to the independence of a binary function of the value of the associated variable, a power supply, the two poles of which, together with the $2^n$ terminations of said switching circuit, constitute a first connector having $2^n+2$ plugs, said output module comprising a second connector having $2^n+2$ plugs adapted to be connected to the corresponding plugs of said first connector, and light bulb means turnable on and off, in various combinations of key positions by the operation of said keys of the input module.

2. The apparatus of claim 1 wherein said input module is connected to said output module via at least one "program" module.

3. The apparatus of claim 2 wherein the program module is equipped with two connectors, the first of which is connected to the input module connector, and the second of which is connected to the output module connector, said program module being adapted to accept a punched card having $2^n$ punch positions establishing a path from each one of the $2^n$ terminations of the input connector to the corresponding output connector.

4. The apparatus of claim 2 wherein the program module is equipped with two connectors, the first of which is connected to the input module connector, and the second of which is connected to the output module connector, said program module comprising $2^n$ jacks, normally open circuited, each establishing a path between the corresponding points of the input and output connectors whenever a short-circuit plug is introduced in said jack.

5. The apparatus of claim 1 wherein the output module comprises $2^n$ light bulbs arranged in a geometric figure.

6. The apparatus of claim 5 including a translucent member and wherein $2^n$ light bulbs are arranged in combination with said screen to provide a Venn diagram.

7. The apparatus of claim 1 wherein the output module comprises two light bulbs, corresponding to "0" and "1" respectively.

8. The apparatus of claim 1 which comprises inversion means for each aforesaid light bulb, comprising an auxiliary light bulb, each aforesaid light bulb and its associated auxiliary light bulb being connected in series between the power source and ground, and a switch adapted to ground the middle point between said associated bulbs, the impedance of said associated bulbs being different and being so related that under the given power supply voltage, the higher impedance bulb shines and the lower impedance bulb is dark, until the middle point between the two bulbs is grounded thereby short circuiting the higher impedance bulb and causing the lower impedance bulb to shine.

9. The apparatus of claim 1 wherein said input module and said output module are disposed in the same housing.

References Cited

UNITED STATES PATENTS

| | | | |
|---|---|---|---|
| 2,444,042 | 6/1948 | Hartley et al. | 235—61 |
| 3,100,943 | 8/1963 | Preston | 35—30 |
| 3,372,381 | 3/1968 | Raspanti | 35—30 X |

EUGENE R. CAPOZIO, Primary Examiner

WILLIAM H. GRIEB, Assistant Examiner

U.S. Cl. X.R.

235—155; 340—347